Figure 1:
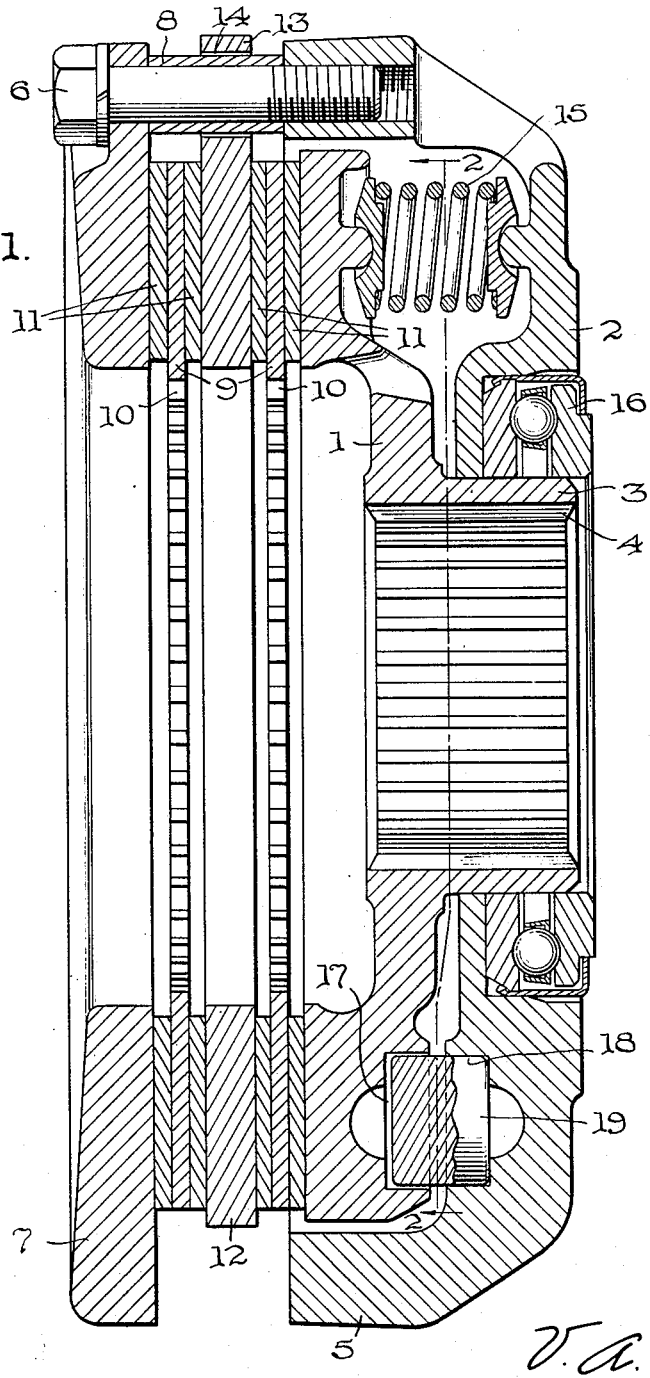

Oct. 29, 1957  V. A. MATRAU  2,811,234
TORQUE-ABSORBING MEANS FOR FRICTION DEVICES
Filed March 8, 1954  2 Sheets-Sheet 1

INVENTOR.
V. A. Matrau
BY
Cobb & Cobb
ATTORNEYS

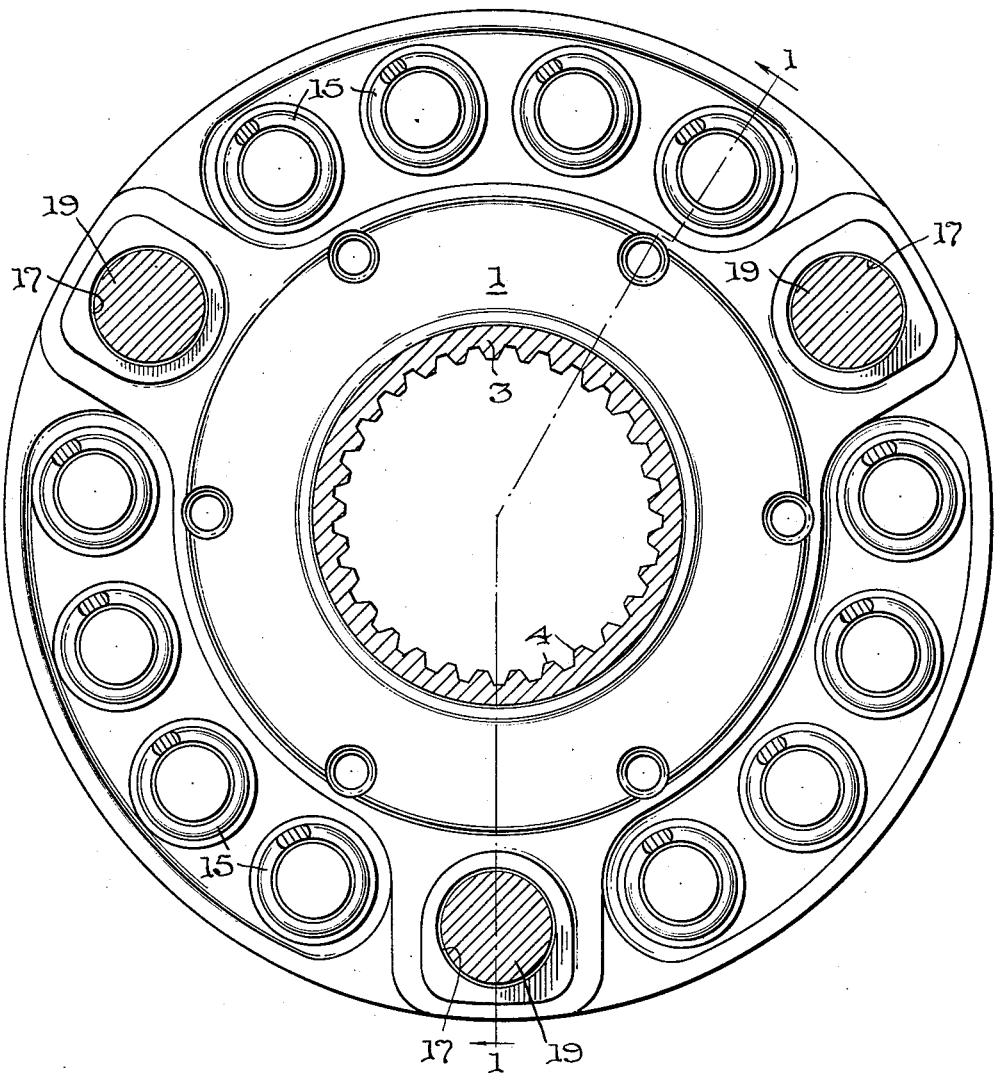

United States Patent Office 2,811,234
Patented Oct. 29, 1957

2,811,234

TORQUE-ABSORBING MEANS FOR FRICTION DEVICES

Virgil A. Matrau, Watervliet, Mich., assignor, by mesne assignments, to Lambert Brake Corporation, St. Joseph, Mich., a corporation of Michigan Application March 8, 1954, Serial No. 414,658

2 Claims. (Cl. 192—66)

The present invention relates to means for absorbing torque in friction devices such as clutches and brakes, and more particularly to means for converting a self-energizing friction device to a non-energizing friction device by absorbing the torque which is normally utilized to effect such self-energization.

In certain types of friction clutches and brakes, there is included self-energizing means. This self-energizing means in various commercially produced forms includes a pair of relatively rotatable and axially shiftable actuator plates or discs, at least one of which is adapted to be shifted axially for frictional contact with a friction disc to engage the friction device, and a camming ball is interposed between the actuator plates to positively force the plates apart responsive to load on the device tending to rotate the plates relative to one another.

In the case of friction clutch constructions, the initial actuation or axial separation of the actuator plates is effected, in most instances, by means of one or more clutch-operating springs. Oftentimes, when such a clutch is employed in a certain type of installation, the clutch-engaging force of the springs alone is sufficient to preclude slippage of the clutch under maximum load. When this occurs, the self-energizing means is superfluous, and the clutch tends to rattle or chatter during actuation thereof.

Accordingly, one of the primary objectives of this invention is to produce a clutch-engaging structure which eliminates such a rattle or chatter as occurs in self-energizing clutch constructions of the above type, by converting the clutch-engaging structure so as to preclude self-energization thereof by including means in association with the actuator discs or plates of the clutch to absorb clutch-energizing torque.

Specifically, it is an objective of this invention to provide an extremely simple insert which is adapted to replace the self-energizing cam means of a self-energizing clutch, thereby rendering the clutch non-energizing by absorbing the load torque on the insert.

In accordance with the foregoing, an insert is mounted in a pair of opposed sockets formed in the opposed faces of a pair of coaxially disposed, relatively axially and otherwise rotatively shiftable actuator plates of a clutch or other comparable friction device, these sockets being adapted, in the case of a self-energizing clutch, to receive a pair of opposed inserts in each of which is formed a conical depression forming a ramped seat for a camming ball between the plates.

Other objects and advantages of this invention will be hereinafter described or will become apparent to those skilled in the art, and the novel features thereof will be defined in the appended claims.

In the drawings:

Fig. 1 is a view in transverse section of a friction clutch embodying the present invention, with the torque-absorbing insert partially broken away and shown in section, this view being taken on the line 1—1 of Fig. 2; and Fig. 2 is a view in section, as taken on the line 2—2 of Fig. 1.

Like reference characters in the views of the drawings and in the following description designate corresponding parts.

The illustrative clutch depicted in the views of the drawings includes a pair of actuator plates or discs 1 and 2 disposed in side-by-side relationship. The disc 1 constitutes a clutch power plate and is formed with a central hub 3 which is axially extended, and on which is shiftably mounted the plate 2 which constitutes a primary actuator plate for the clutch. The hub 3 is hollow, and about its inner periphery, it is provided with a plurality of splines 4 adapted to coact with complemental splines on a rotatable shaft (not shown) to connect the power plate 1 to the shaft for rotation therewith.

The outer margin of the plate 2 is flanged axially as at 5, and secured to this flange, as by means of a suitable number of screws 6 is a clutch pressure plate 7 disposed on the side of the power plate 1 opposite the primary plate 2, and which is preferably maintained in spaced relation to the flange 5 by means of a sleeve 8 surrounding each screw 6.

A pair of friction discs 9, 9 of annular form are disposed between the opposed faces of the pressure plate 7 and the power plate 1, and about the inner margin of each of the discs 9 there is provided a plurality of splines 10 adapted to engage with complemental splines on a second rotatable member (not shown), so as to connect the discs 9 to the rotatable member for rotation therewith and for axial shifting movements thereon. On the opposite side faces of the respective discs 10, they are each preferably provided with suitable friction lining material 11 for frictional engagement with the pressure plate 7 and with the power plate 1, as well as for frictional engagement with the opposite side faces of an intermediate disc or plate 12.

This intermediate plate 12 is of ring-like form, and on its outer periphery, it is provided with a number of ears or projections 13. An opening 14 extends axially through each ear 13, and the plate 12 is mounted upon the sleeves 8 on the screws 6 so as to float thereon between the friction discs 9.

Interposed between the power plate 1 and the primary plate 2 is a suitable number of clutch-engaging spring assemblies 15, which in the illustrated clutch are arranged in circumferentially spaced groups of four springs per group. These springs 15 serve to engage the clutch by shifting the primary plate 2 away from the power plate 1 to thereby engage the friction discs 9 and the intermediate disc 12 between the plates 7 and 1. To disengage the clutch, the primary plate 2 must be shifted axially towards the power plate 1, and for this purpose, the primary plate 2 is adapted to be fitted with a throw-out bearing assembly 16 which is operative by any suitable clutch release mechanism (not shown).

The clutch thus far described forms no part of the present invention, except insofar as the power plate 1 and the primary plate 2 constitute a pair of axially spaced actuator discs disposed in side-by-side relation and mounted for relative axial movement to effect engagement and disengagement of a friction device. On the contrary, the illustrative clutch corresponds substantially with a known form of self-energizing clutch which includes a plurality of cooperative camming balls and inserts in the opposed faces of the plates 1 and 2 for effecting self-energization of the clutch responsive to relative rotation of the primary plate 2 and the power plate 1 due to lagging of the friction discs 9 behind the power plate 1, on the one hand, or due to lagging of the power plate 1 behind the friction discs 9, on the other hand, when the clutch is engaged to transmit torque from one rotatable member to another. The aforementioned camming balls and inserts (not shown) are normally mounted in opposed sockets in the opposed faces of the plates 1 and 2, corresponding to the sockets 17 and 18 shown in the discs or plates 1 and 2, respectively, of the present clutch.

However, in order to render the illustrative clutch non-energizing, according to certain of the objectives of the present invention, a rigid torque-absorbing member in the form of a cylindrical insert 19 is disposed in the sockets 17 and 18 for cooperative engagement with the plates 1 and 2 to absorb the torque imparted to the primary plate 2 responsive to load on the clutch. As is seen in Fig. 2, there are preferably three torque-absorbing inserts 19 disposed in equi-distantly spaced relation intermediate the groups of springs 15 circumferentially about the axis of the clutch.

The clutch is shown in an engaged condition, and in order to disengage the same, it will be necessary to shift the plate 2 towards the power plate 1. Therefore, the inserts 19 have an axial dimension which is less than the distance between the bases of the opposed sockets 17 and 18, so as to allow clutch disengaging movements of the actuator plate 2. As is best seen in Fig. 1, the respective inserts 19 are closely fitted into the sockets 18, so that the inserts 19 are actually carried by the plate 2 and shift axially in the socket 17 in the power plate 1, the inserts fitting loosely in the socket 17 to allow free movement of the inserts therein.

The inserts 19 and the complemental sockets 17 and 18 are preferably so formed that the inserts 19 may be replaced by the camming inserts and balls, as previously described, if it is desired to render the clutch self-energizing, and correspondingly, the inserts are preferably made of such a size and form as to be readily applicable to a self-energizing clutch in lieu of the aforementioned camming balls and inserts, to render the clutch nonenergizing. However, the inserts 19 may have any suitable form other than the purely cylindrical form shown in the drawings, as long as they are rigid and capable of absorbing the load-responsive torque imparted to the power plate 2 when the friction discs 9 tend to lag behind the power plate 1 during clutch engagement.

While the specific details of the present invention have been herein shown and described, changes and alterations may be resorted to without departing from the spirit thereof as defined in the appended claims.

I claim:

1. A friction device of the class described, comprising relatively rotatable members adapted to be shifted into frictional engagement and including a pair of axially spaced actuator discs, one of said discs being relatively stationary and the other of said discs being freely mounted for movements relative to said relatively stationary disc, means for shifting said freely mounted disc away from said relatively stationary disc to effect frictional engagement of said members; said discs having a pair of opposed recesses therein adapted to receive self-energizing means, and conversion means removably disposed in said recesses and extending between said discs for absorbing energizing torque imparted to said freely mounted disc responsive to engagement of the relatively rotatable members aforesaid and thereby preventing rotation of the freely mounted disc.

2. An actuator disc assembly for friction disc devices comprising a pair of relatively shiftably mounted actuator discs disposed in side-by-side relation, means for shifting said discs relatively axially, and means cooperatively engaged with said discs for absorbing energizing torque normally imparted thereto incident to activation of the friction disc device with which the actuator disc assembly is associated, and thereby prevent relative rotation of said actuator discs, said actuator discs each being provided with a socket, said sockets being disposed in axial alignment with one another and being in a form adapted to receive self-energizing means between the actuator discs, and said torque-absorbing means comprising a rigid member removably disposed in said sockets and extending between said discs.

References Cited in the file of this patent

UNITED STATES PATENTS

| 1,489,423 | Brown et al. | Apr. 8, 1924 |
| 1,862,991 | Vargha | June 14, 1932 |
| 2,150,083 | Stanley | Mar. 7, 1939 |
| 2,728,429 | Kershner | Dec. 27, 1955 |